(12) United States Patent
Takahashi

(10) Patent No.: US 6,748,891 B2
(45) Date of Patent: Jun. 15, 2004

(54) FRICTIONAL RESISTANCE REDUCING METHOD, AND SHIP WITH REDUCED FRICTIONAL RESISTANCE

(75) Inventor: Yoshiaki Takahashi, Tokyo (JP)

(73) Assignee: Ishikawajima-Harima Heavy Industries Co., Ltd., Tokyo (JP)

(*) Notice: Subject to any disclaimer, the term of this patent is extended or adjusted under 35 U.S.C. 154(b) by 67 days.

(21) Appl. No.: 10/019,765

(22) PCT Filed: Dec. 7, 2000

(86) PCT No.: PCT/JP00/08664
§ 371 (c)(1),
(2), (4) Date: Nov. 9, 2001

(87) PCT Pub. No.: WO01/66410
PCT Pub. Date: Sep. 13, 2001

(65) Prior Publication Data
US 2003/0097971 A1 May 29, 2003

(30) Foreign Application Priority Data

| Jun. 8, 1999 | (JP) | ............................................ 11-161710 |
| Jun. 8, 1999 | (JP) | ............................................ 11-161711 |
| Mar. 10, 2000 | (JP) | ........................................ 2000-067649 |

(51) Int. Cl.$^7$ ................................................ B63B 1/34
(52) U.S. Cl. ..................................................... 114/67 A
(58) Field of Search ................................. 114/274, 278, 114/67 A (56) References Cited

U.S. PATENT DOCUMENTS

| 1,398,246 A | * | 11/1921 | Trask | ........................ 114/67 A |
| 1,894,256 A | * | 1/1933 | Ganahl et al. | ............ 114/67 A |
| 3,662,700 A | * | 5/1972 | Roumejon | ................ 114/67 A |
| 3,875,885 A | * | 4/1975 | Balquet et al. | ........... 114/67 A |
| 4,296,511 A | * | 10/1981 | Wright | |
| 5,787,829 A | | 8/1998 | Oshima | |

FOREIGN PATENT DOCUMENTS

| JP | 50-83992 | 7/1975 |
| JP | 53-136289 | 11/1978 |
| JP | 57-95286 | 6/1982 |
| JP | 60-139586 | 7/1985 |
| JP | 61-39691 | 3/1986 |
| JP | 61-128185 | 8/1986 |
| JP | 61-71290 | 12/1986 |
| JP | 3-243489 | 10/1991 |
| JP | 3-246188 | 11/1991 |
| JP | 9-71289 | 3/1997 |
| JP | 9-86482 | 3/1997 |
| JP | 10-7070 | 1/1998 |

* cited by examiner

*Primary Examiner*—Ed Swinehart
(74) *Attorney, Agent, or Firm*—Fish & Richardson P.C.

(57) ABSTRACT

The present invention relates to a method for reducing the frictional drag of a ship and to a ship with reduced frictional drag, and its objects include effectively reducing the driving force used during the travel of a ship by decreasing the power required for delivering gas into water as well as to decrease the construction cost for a ship. A negative pressure portion 21 whose pressure becomes lower than the pressure in a gas space during the travel is formed in the water, and bubbles 22 are discharged into the water by introducing gas from the gas space to the negative pressure portion 21 in water.

7 Claims, 11 Drawing Sheets

FRICTIONAL RESISTANCE REDUCING METHOD, AND SHIP WITH REDUCED FRICTIONAL RESISTANCE

TECHNICAL FIELD

The present invention relates to a method for reducing the frictional drag of a ship and to a ship with reduced frictional drag. In particular, the present invention relates to a technique by which energy required for delivering gas into water is reduced, and thereby power required for sailing a ship is effectively decreased.

This application is based on Japanese Patent Application No. 20000-067649, the contents of which are incorporated herein by reference.

BACKGROUND ART

A technique relating to a ship with reduced frictional drag is disclosed in Japanese Unexamined Patent Application, First Publication, No. 50-83992, Japanese Unexamined Patent Application, First Publication, No.53-136289, Japanese Unexamined Patent Application, First Publication, No. 60-139586, Japanese Unexamined Patent Application, First Publication, No. 61-71290, Japanese Utility Model Application No. 61-128185, and Japanese Utility Model Application No. 61-128185, etc. In a ship with reduced frictional drag, a number of microbubbles are produced so as to be present on a shell plating of a hull by delivering gas, such as air, into water from the outer surface of the hull (i.e., the shell plating) while the ship is in a sailing mode so that frictional drag generated between the hull and the water may be reduced by the presence of the microbubbles.

As a technique relating to the above-mentioned ship with reduced frictional drag, the applicant of the present invention proposed a technique by which microbubbles are produced to be present at a shell plating of a hull by delivering gas (for instance, air) into water from the vicinity of the bow. The aim of the technique is to cover the shell plating with microbubbles, which are generated by delivering gas from the vicinity of the bow, by diffusing the microbubbles along the flow of water on the shell plating. Conventionally, a gas supply device, such as a blower, has been used as a driving source for delivering the gas into water.

However, if a gas supply device, such as a blower, is used for delivering gas, a portion of the sailing power which is saved by the generation of microbubbles is lost because the power is consumed for driving the gas supply device. In the case where microbubbles are delivered at the vicinity of the ship's bottom, in particular, a large driving force tends to be required for the delivery of gas since it is necessary to deliver the gas using a larger force than the static pressure present in the vicinity of the ship's bottom. Also, a large cost for the device, operation, etc., will be required if a gas supply device is installed.

DISCLOSURE OF THE INVENTION

The present invention takes into consideration the above-mentioned circumstances with the following objects:

(1) To effectively decrease the power required for sailing a ship by reducing power necessary for delivering gas into water, and (2) To reduce the construction cost of a ship.

In order to achieve the above objects, the present invention provides a method for reducing frictional drag between a hull and the water by generating bubbles in the vicinity of the surface of a shell plating of the hull in which a technique to discharge bubbles into water is adopted so that a negative pressure portion, whose pressure becomes lower with respect to a gas space as the ship travels, is formed in water, and gas is introduced into the negative pressure portion in water from the gas space.

Also, the present invention provides a ship with reduced frictional drag which reduces frictional drag between a hull and the water by generating bubbles in the vicinity of the surface of a shell plating of the hull, in which a technique to provide a negative pressure formation part which is disposed at the shell plating of the hull in order to form a negative pressure portion, whose pressure is lower than the pressure of a gas space, in water, and a gas path which introduces gas into the negative pressure portion in water from the gas space, is adopted.

Figure 1:
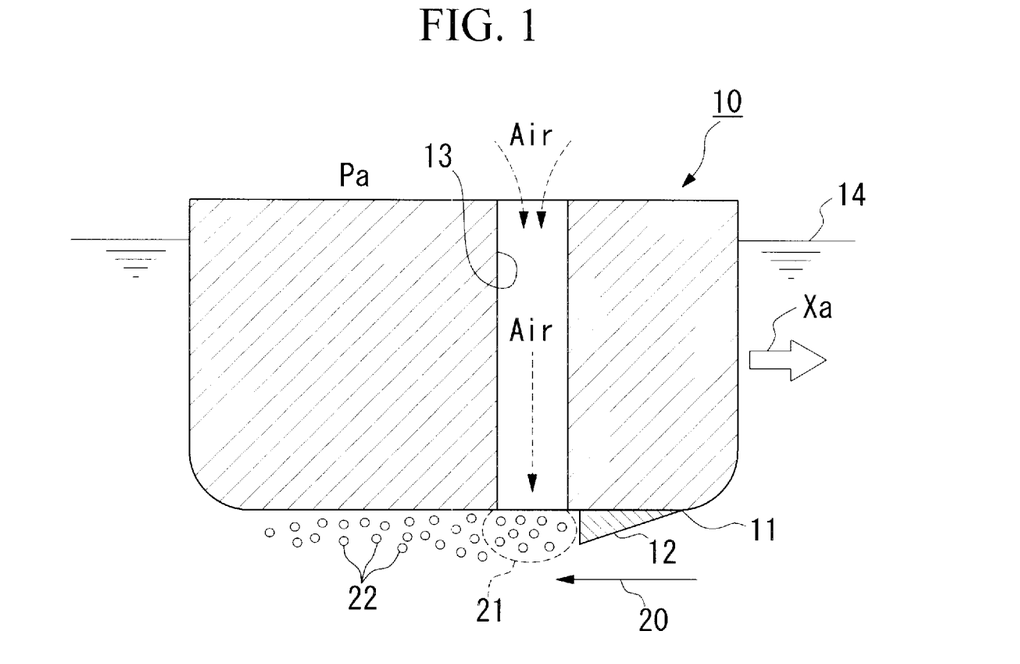
FIG. 1 is a schematic diagram for explaining an outline of a method for reducing a frictional drag of a ship and a ship with reduced frictional drag according to the present invention.

Here, an explanation is made for reducing frictional drag of a hull by using the above-mentioned techniques. FIG. 1 is a schematic diagram showing a ship 10 with reduced frictional drag according to an embodiment of the present invention. In FIG. 1, the numeral 11 indicates a shell plating of a hull, the numeral 12 indicates a negative pressure formation part, the numeral 13 indicates a gas path, and the numeral 14 indicates a water level (i.e., the waterline). A flow of water 20 is created relative to the ship 10 as the ship 10 sails in the direction indicated by the arrow Xa in the figure at a predetermined speed Vh.

The ship 10 with reduced frictional drag forms a negative pressure portion 21 in water whose pressure becomes lower (negative pressure, vacuum) than the pressure of a gas space (atmospheric air) during the travel. That is, the flowing state of water is changed to a desirable state using the negative pressure formation part 12 which is disposed at the shell plating 11, in order to form the negative pressure portion 21 in water (a negative pressure system).

Figure 2:
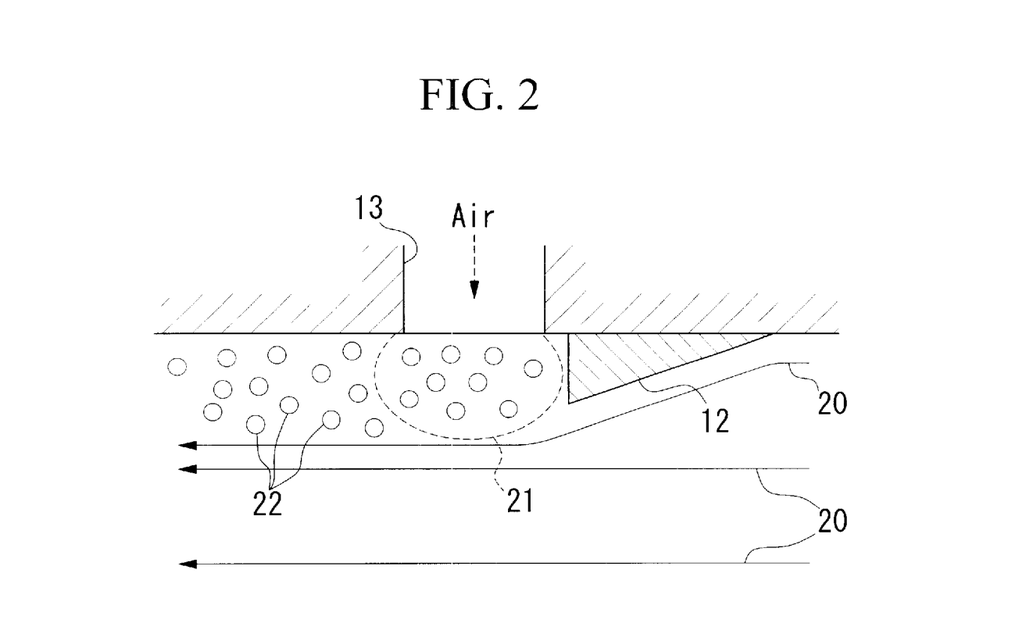
FIG. 2 is a schematic diagram showing an enlarged view of a part for delivering gas in a ship with reduced frictional drag.

As a means for forming the negative pressure portion 21 in water, for instance, as shown in FIG. 2, the flow rate of water passing through a passage along the shell plating 11 of the hull may be increased by narrowing the passage by means of the negative pressure formation part 12 (Bernoulli's theorem). In this case, the pressure P at the passage may be expressed by the following equation:

$$P = P_0 + \rho \cdot g \cdot h - \rho \cdot (V_1^2 - Vh^2)/2 \qquad (1)$$

where $V_1$ indicates the flow rate of water, $P_0$ indicates the pressure of the gas space (atmospheric pressure), $\rho$ indicates the density of water, g indicates the gravitational acceleration, and h indicates the depth of water. As is apparent from equation (1), it is possible to form the negative pressure portion 21 in water by sufficiently increasing the flow rate of water $V_1$ at a particular portion with respect to the speed of the ship Vh.

Also, it is known that a low-pressure portion (a flow separation area) tends to be generated behind an object placed in a flow because the matter changes the flowing state and causes a separation of a boundary layer of the fluid. That is, the negative pressure portion 21 may also be formed by generating a flow separation area in water by the above-mentioned negative pressure formation part 12.

In general, if a bluff body which increases the resistance against a flow is placed in a uniform flow, a flow separation area associated with irregular vortexes is generated in the downstream area immediately behind the bluff body. For example, if a cylinder is put in a uniform flow, a fluid flows along the cylinder at decreasing pressure until it reaches a minimum pressure point, and immediately after that, it separates from the surface of the cylinder and a flow separation area is formed. In this case, it is confirmed by experiment that the pressure at the minimum pressure point may be expressed as, for instance, $$(P-P_0)/(\rho V^2/2) \approx -2.2 \qquad (2)$$

(where P is static pressure, $P_0$ is reference pressure, $\rho$ is the density of fluid, and V is the flow rate). Accordingly, if the flow rate V is 7 m/s (about 14 knots), and the reference pressure $P_0$ is 1 kgf/cm$^2$ (atmospheric pressure), the static pressure P (absolute pressure) is calculated to be about 0.45 kgf/cm$^2$, which is a negative pressure with respect to the atmospheric pressure. This indicates that it is possible, if the depth of water is about 5.5 m or shallower, to generate a flow separation area of negative pressure on the surface of a cylinder by flowing the cylinder in water at a speed V of 7 m/s.

According to the ship 10 with reduced frictional drag of an embodiment of the present invention, the negative pressure portion 21 is formed in water in the above-mentioned manner, and gas is supplied from a gas space at the high pressure side to the negative pressure portion 21 at the low pressure side in water via the gas path 13 in order to discharge bubbles 22 in water. In this manner, the shell plating 11 of the hull is covered by the bubbles 22 and the frictional drag between the ship 10 and the water is decreased.

Figure 3A:
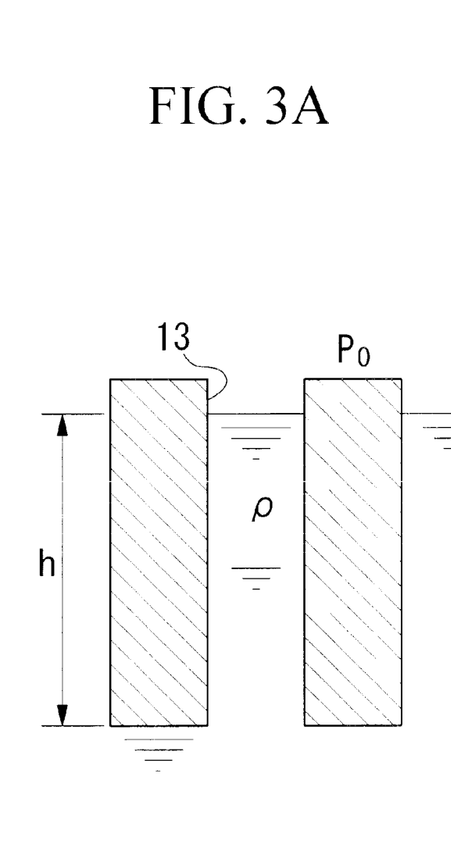
FIGS. 3A through 3C are schematic diagrams showing state in which water or gas is filled in a gas path, 3A shows a state in which water is filled in the gas path, 3B shows a state in which gas is filled by using a negative pressure system according to the present invention, and 3C shows a state in which gas is filled by using a conventional pressurizing system.

Now, in a static liquid having a density $\rho$ as shown in FIG. 3A, in general, the energy E which is required for delivering a bubble having the volume $\Delta v$ (the density of the bubble is considered to be nil) to a position at the depth h from the liquid level may be expressed as:

$$E = (P-P_0) \cdot \Delta v \qquad (3)$$

where p indicates the pressure ($=\rho \cdot g \cdot h$) at a delivering position of the gas. As is obvious from the equation (3), for the case where the pressure P at the delivering position of the gas becomes lower than the atmospheric pressure $P_0(P<P_0)$, the energy becomes negative (E<0), and hence, theoretically, the energy for delivering the gas becomes unnecessary.

Figure 3B:
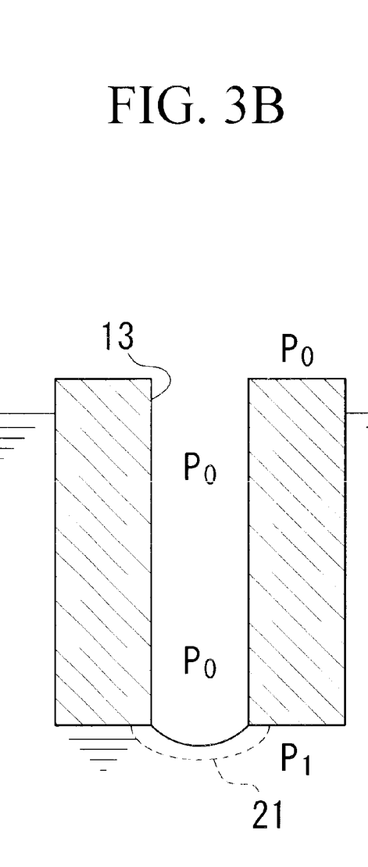

That is, as shown in FIG. 3B, when gas is delivered into water by forming the negative pressure portion 21 in water using a technique according to the present invention, energy for delivering the gas to the delivering position of gas (at the depth h) is only required as a main power for delivering the gas. The energy is obtained by changing the flowing state of water using a negative pressure formation part, and is included in the driving force (navigation force) of the ship.

Figure 3C:
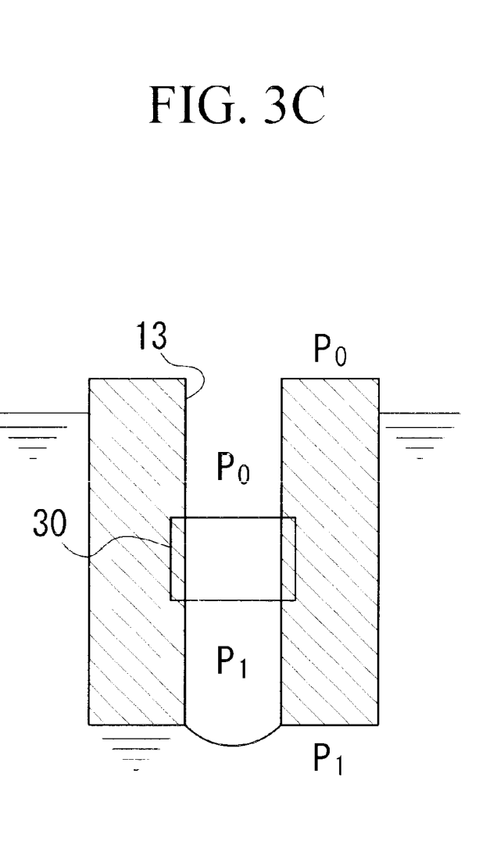

On the other hand, in a conventional method for reducing a frictional drag, gas is pressurized by using a gas supply device 30, such as a blower or a pump used as a pressurizing means, when delivering the gas into water as shown in FIG. 3C. In this case, in addition to the energy for delivering gas to a delivering position of gas (at the depth h), energy for pressurizing the gas by overcoming the hydraulic pressure P1 (i.e., the energy expressed by the equation (3)=energy for increasing the internal energy of the gas) is required as the power necessary for delivering the gas.

That is, in decreasing the frictional drag of a ship, the power required for delivering gas into water may be reduced by adopting a technique according to the present invention. When gas is delivered to a place of large depth, such as the bottom of a large ship, in particular, a great amount of energy is consumed if a conventional method is used because it is necessary to pressurize air to overcome the large static pressure (hydraulic pressure). However, according to the present invention, gas may be easily delivered into water by simply forming a negative pressure portion in water. Since it is considered that the shape of a negative pressure formation part or the Reynolds number is a main factor dominating in the formation of a negative pressure portion and that disadvantages due to the water depth do not tend to be caused in the formation of a negative pressure portion, the technique according to the present invention has advantages when applied to a large ship.

Also, the movement of bubbles generated in water differs in the above-mentioned negative pressure system according to the present invention and in a conventional pressurized system. The main cause of this is the difference in the pressure inside the bubbles immediately after being generated in water.

That is, in a conventional pressurized system, the size of the bubbles is not significantly changed when the bubbles move at a constant depth since the bubbles generated have an internal pressure which is substantially the same as the static pressure corresponding to the water depth.

On the other hand, according to the negative pressure system of the present invention, since bubbles generated have an internal pressure which is lower than the static pressure corresponding to the depth of water, the size of the bubbles is gradually decreased when they move at a constant depth (for instance, when the bubbles move along the bottom of a ship) separating away from the negative pressure portion due to the large hydraulic pressure applies onto the bubbles.

According to studies carried out by the applicant of the present invention, it is recognized that bubbles of relatively small size are more advantageous for decreasing the frictional drag of a ship. That is, the present invention has an advantage in that bubbles of small size, which are considered to be advantageous for reducing the frictional drag, may be easily generated by delivering gas using the negative pressure system. Also, since the bubbles tend to flow from a portion of high pressure to a portion of low pressure, a force is applied to the bubbles in the direction toward the negative pressure portion. Accordingly, the bubbles do not relatively tend to separate away from the shell plating of the hull, and it becomes possible to effectively use the bubbles for reducing the frictional drag. Note that the amount of bubbles generated at the negative pressure portion 21 is affected by the saturated vapor pressure which is determined based on environmental conditions in the vicinity thereof. That is, an amount of gas which is larger than that may be dissolved in flowing water is present as bubbles in water.

BEST MODE FOR CARRYING OUT THE INVENTION

Next, the first embodiment according to the present invention will be described with reference to FIGS. 4 through 7.

Figure 4:
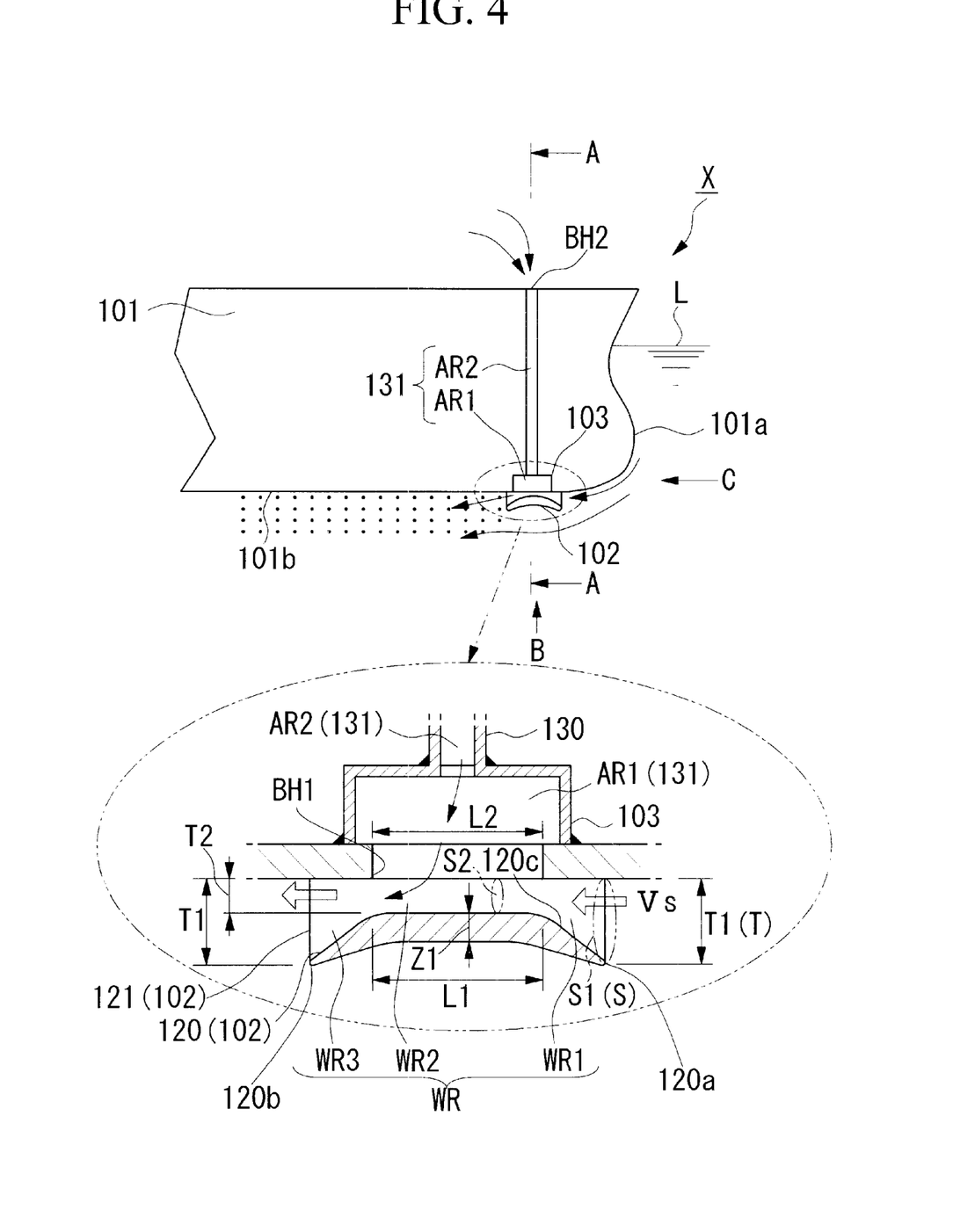
FIG. 4 is a diagram showing a main side view and an enlarged cross-sectional view of a ship with reduced frictional drag according to a first embodiment of the present invention.

In a ship X with reduced frictional drag according to this embodiment, the present invention is adopted in a flat bottom ship, such as a tanker. FIG. 4 is a diagram showing a schematic cross-sectional view of a main structure in the vicinity of a bow of the ship X with reduced frictional drag. In the figure, the numeral 101 indicates a shell plating of a hull, and L indicates the waterline.

In the shell plating 101, an elongated hole BH1, which is elongated in the width direction of the ship, is formed at the ship's bottom 101b in the vicinity of a bow 101a. The ship's bottom 101b side of the elongated hole BH1 is surrounded by a flowing water guiding portion 102 from the downward direction, and the inner side of the elongated hole BH1 is covered by a chamber bulkhead 103.

The flowing water guiding portion 102 includes a guiding fin 120 which is disposed substantially parallel to the ship's bottom 101b with a predetermined interval therebetween, and a side wall 121 which is disposed between the guiding fin 120 and the ship's bottom 101b to support the guiding fin 120.

Figure 5:
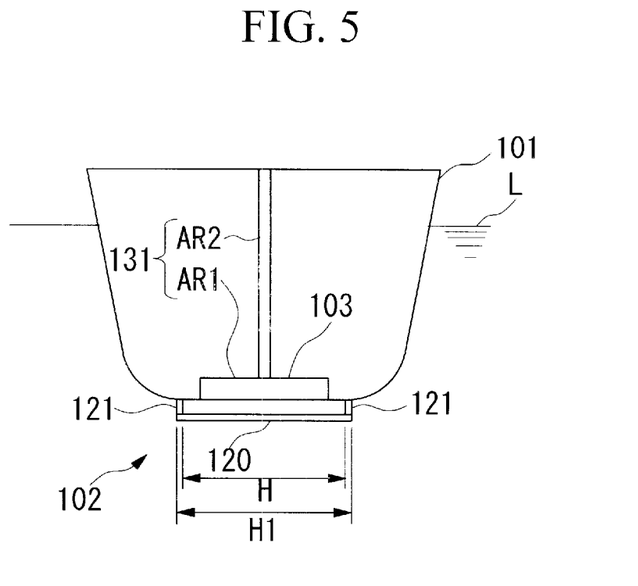
FIG. 5 is a diagram showing a cross-sectional view taken along line A shown in FIG. 4.

The guiding fin 120 has a predetermined thickness Z1 so as to have sufficient rigidity, and is designed so that the thickness thereof gradually decreases in the vicinity of an edge 120a of the bow 101a side and in the vicinity of an edge 120b of the stern side. Also, the bow 101a side and the stern side of the guiding fin 120 are designed to be inclined downwardly so that the distance (height T) between an upper surface 120c thereof and the shell plating 101 becomes the largest (=height T1) at the edges 120a and 120b and the smallest (=height T2) in the vicinity of the central portion thereof. Moreover, the guiding fin 120 is designed so that the length L1 in the length direction of the ship at the central portion where the distance to the shell plating 101 becomes the smallest becomes substantially equal or slightly longer than the length L2 of the elongated hole BH1 in the length direction of the ship. Further, as shown in FIG. 5, the guiding fin 120 has a width H1 in the width direction of the ship, and both edge portions thereof are supported by the side wall 121.

Figure 6:
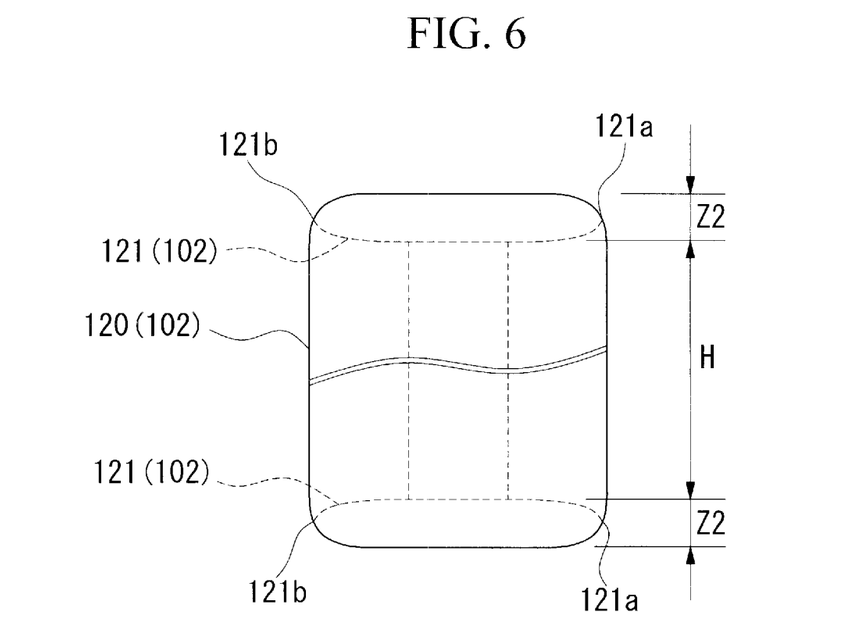
FIG. 6 is a diagram showing a cross-sectional view taken along line B shown in FIG. 4.
Figure 7:
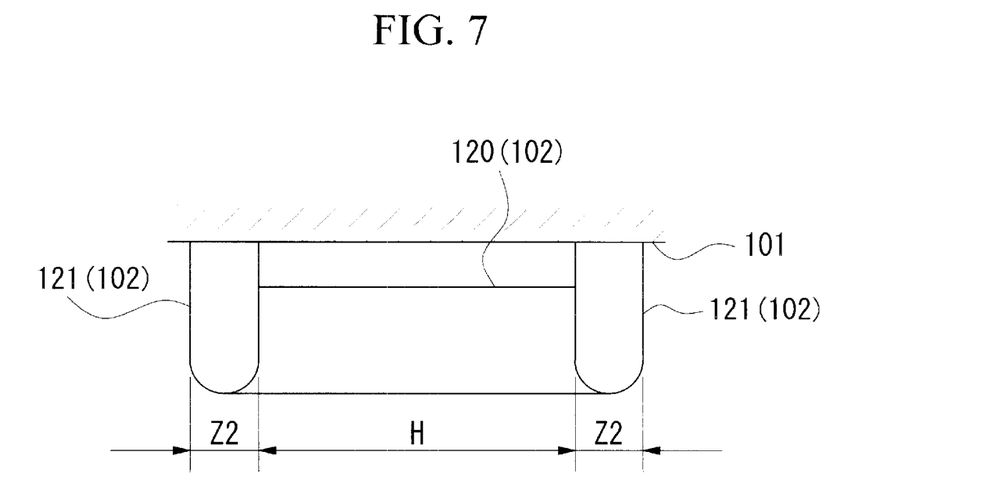
FIG. 7 is a diagram showing a cross-sectional view taken along line C shown in FIG. 4.

The side wall 121, as shown in FIG. 6, has a predetermined thickness Z2 so that it maintains a sufficient strength when supporting the guiding fin 120. Also, similar to the guiding fin 120, the side wall 121 is designed so that the thickness thereof gradually decreases in the vicinity of the edge 121a of the bow 101a and in the vicinity of the edge 121b at the stern side.

As shown in FIG. 4, a passage WR having an opening in the bow 101a direction and in the stern direction is formed on the shell plating 101 by the flowing water guiding portion 102. Since the cross-sectional area S of the passage WR is calculated by multiplying the passage height T by the passage width H, the size of the area is changed in accordance with the change in the passage height T. The passage WR may be separated into (an introduction portion WR1) which is an area where the cross-sectional area S of the passage gradually decreases toward the stern, (a slit portion WR2) which is an area in the vicinity of the central portion having the smallest cross-sectional area S of the passage, and (a discharge portion WR3) which is an area where the cross-sectional area S of the passage gradually increases towards the stern. Also, in the passage WR, the passage cross-section at an inlet of the introduction portion WR1 (an opening area S1) and the passage cross-section at the slit portion WR2 (a slit area S2) are designed to have a predetermined ratio based on the depth of water, standard navigation speed, etc. The ratio will be described later.

The chamber bulkhead 103 may be formed, for example, in a box shape, one face of which is opened, and a chamber space AR1 of a rectangular shape is formed inside thereof by welding an opening end with the shell plating 101. An air induction pipe 130 made of a tubular member is welded to a predetermined portion of the chamber bulkhead 103 so that a pipe space AR2 inside the air induction pipe 130 communicates with the chamber space AR1.

Also, the air induction pipe 130 is disposed so as to penetrate the inside of the hull in the upward direction from the chamber bulkhead 103. Also, an air intake opening BH2 is disposed on the deck so that the pipe space AR2 communicates with the atmospheric air.

The chamber space AR1 and the pipe space AR2 are formed so as to communicate with each other, and a gas path 131, one end of which is opened to the atmospheric air at the air intake opening BH2 on the deck and the other end of which is opened to the passage WR at the elongated hole BH1, is provided with the hull. Also, the elongated hole BH1 is formed so as to face the slit portion WR2 so that one end of the gas path 131 is opened in water at the area where the cross sectional area of the path is the smallest.

The chamber bulkhead 103 and the air induction pipe 130, which form the gas path 131, are subjected to a corrosion resistance treatment so that wall surfaces of at least the gas path 131 side are not corroded by sea water and the cross-sectional area and the shape of each are designed so that, preferably, the fluid flowing in the path is not subjected to an extra pressure loss.

In the ship X with reduced frictional drag having the above-mentioned configuration, the level of sea water in the gas path 131 is the same as that around the ship in an anchorage state. When the ship travels, sea water flows along the shell plating 101 of the hull and enters into the passage WR.

The flow rate Vs of sea water flowing along the introduction portion WR1 gradually increases as the cross-sectional area S gets narrower. The flow rate Vs reaches the maximum at the slit portion WR2, and accordingly, the static pressure at the slit WR2 decreases.

In this embodiment, the ratio of the opening area S1 to the slit area S2 is determined so that the pressure of the slit portion WV2 becomes a vacuum (a pressure lower than the atmospheric pressure) during the travel of the ship at a standard navigation speed Vh, and the passage WR is formed based on the ratio. That is, since a static pressure P may be expressed by: $P = \rho g h + V s^2 / 2$ where h is the depth of water at the passage WR ($\rho$: the density of water, and g: the gravitational acceleration) based on the Bernoulli's theorem, and the flow rate Vs at the slit portion WR2 is calculated based on $Vs = Vh \cdot (S1/S2)$, the area ratio (S1/S2) is determined, based on the above equation (2), so that the static pressure P becomes lower than the atmospheric pressure. In this manner, the static pressure at the slit portion WR2 becomes a vacuum when the ship reaches the standard navigation speed Vh.

When the pressure at the slit portion WR2 reaches a vacuum pressure, sea water in the gas path 131, one end (the air intake opening BH2) of which is opened to the atmosphere, is discharged into the passage WR from the elongated hole BH1. Also, air is supplied into the gas path 131 from the air intake opening BH2 and is delivered into the passage WR (in water) from the elongated hole BH1.

Microbubbles (fine air bubbles) are generated in the vicinity of the discharge portion WR3 due to air delivered into the passage WR, and the microbubbles flow toward the stern to cover the ship's bottom 101b and decrease the frictional drag between the ship and the water.

In this process, the amount of air delivered into the passage WR per unit time becomes larger as the cross-sectional area of the air induction pipe 130 gets larger. Also, according to studies carried out by the applicant so far, it is possible to calculate the capacity of microbubbles to reduce a frictional drag if the amount of air delivered per unit time is known. Therefore, according to this embodiment, the cross-sectional area of the air induction pipe 130, and the size and the shape of the flowing water guiding portion 102 are determined by analysis so that the ability of microbubbles to reduce a frictional drag compensates for the increase in a wave making resistance due to the presence of the flowing water guiding portion 102 and saves a navigation power.

That is, according to the ship X with reduced frictional drag of this embodiment, since the passage WR whose cross-sectional area S gradually decreases toward the stern due to the flowing water guiding portion 102 is provided, a vacuum pressure in the slit portion WR2 may be realized by the flow of sea water in the passage WR during the travel. For this reason, the atmospheric air is delivered to the slit portion WR2 through the gas path 131, and hence, gas is delivered into water without the necessity of any driving forces other than the driving force for the navigation. Moreover, since the flowing water guiding portion 102 is disposed at the ship's bottom 101b in a state extending in the width direction of the ship, air may be delivered over the width of the ship's bottom 101b so that fine air bubbles widely cover the ship's bottom. Accordingly, the navigation power for the ship may be effectively saved by reducing the frictional drag using the microbubbles.

Figure 8:
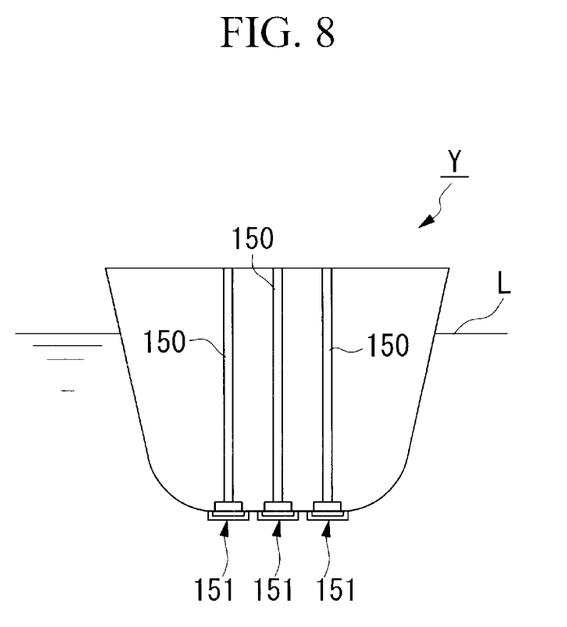
FIG. 8 is a diagram showing a main cross-sectional view in which a plurality of gas paths are disposed.

FIG. 8 is a diagram showing a second embodiment according to the present invention.

Unlike the above-mentioned first embodiment, in a ship Y with reduced frictional drag according to this embodiment, three gas paths 150 are disposed in the width direction of the ship. Also, a flowing water guiding portion 151 is provided for each one of the gas paths 150. Since a plurality of flowing water guiding portions 151 are provided in this embodiment, a space occupied by one gas path 150 is reduced, and hence, it becomes easy to effectively place the gas paths 150 in a hull. Moreover, since air is delivered to a plurality of places, it becomes possible to decrease the amount of air delivered to one place. Accordingly, it becomes possible to deliver securely the necessary amount of air to each place, and the amount of fine air bubbles present at the ship's bottom may be evenly dispersed in the width direction of the ship.

Figure 9A:
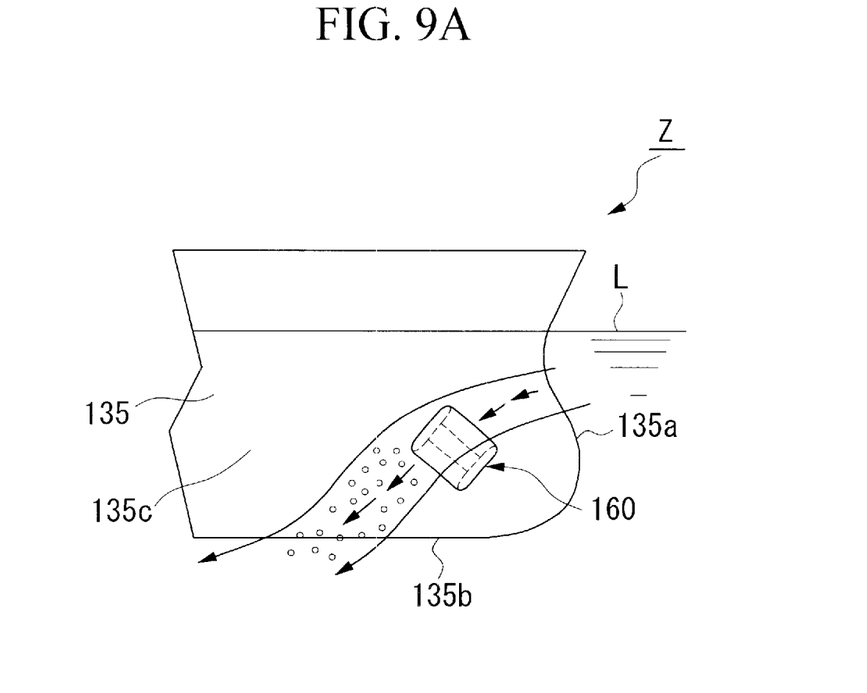
FIG. 9 are diagrams showing a main side view and a front view of a third embodiment according to the present invention.
Figure 9B:
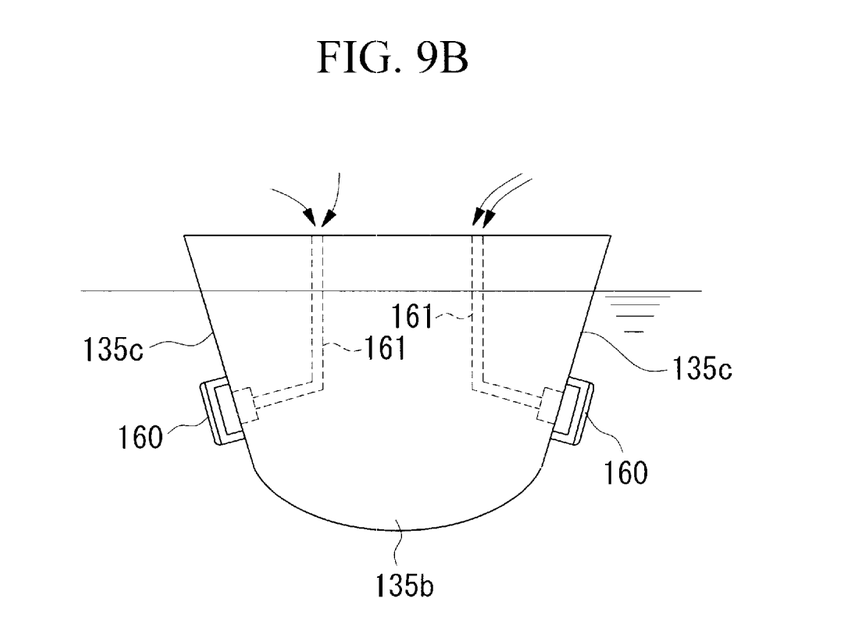

FIG. 9 are diagrams showing a third embodiment according to the present invention. In this embodiment, the present invention is applied to a high speed vessel. That is, in a ship Z with reduced frictional drag according to this embodiment, flowing water guiding portions 160 are disposed on shipboard 135c (a starboard and a port) in the vicinity of a bow 135a, not at a ship's bottom 135b, so that air may be delivered via a gas path 161, since the ship's bottom 135b is relatively small as compared with the shipboard 135c. In the high speed vessel Z, as shown in FIG. 9A, sea water easily flows toward the ship's bottom 135b from the bow 135a. That is, the same effect as the flat bottom ship explained in the first embodiment may also be obtained for the high speed vessel Z by disposing the flowing water guiding portion 160 on the shipboard 135b.

As explained above, it is possible to apply the present invention flexibly to various shapes of hulls or standard navigation speeds by suitably determining a position or a number of flowing water guiding portions.

Next, a fourth embodiment according to the present invention will be described with reference to FIGS. 10 through 12.

In a ship X2 with reduced frictional drag according to this embodiment, the present invention is adopted in a flat bottom ship, such as a tanker. FIG. 10 is a diagram showing a schematic cross-sectional view of a main structure in the vicinity of a bow of the ship X2 with reduced frictional drag. In the figure, the numeral 201 indicates a shell plating of a hull, and L indicates a water line.

Figure 10:
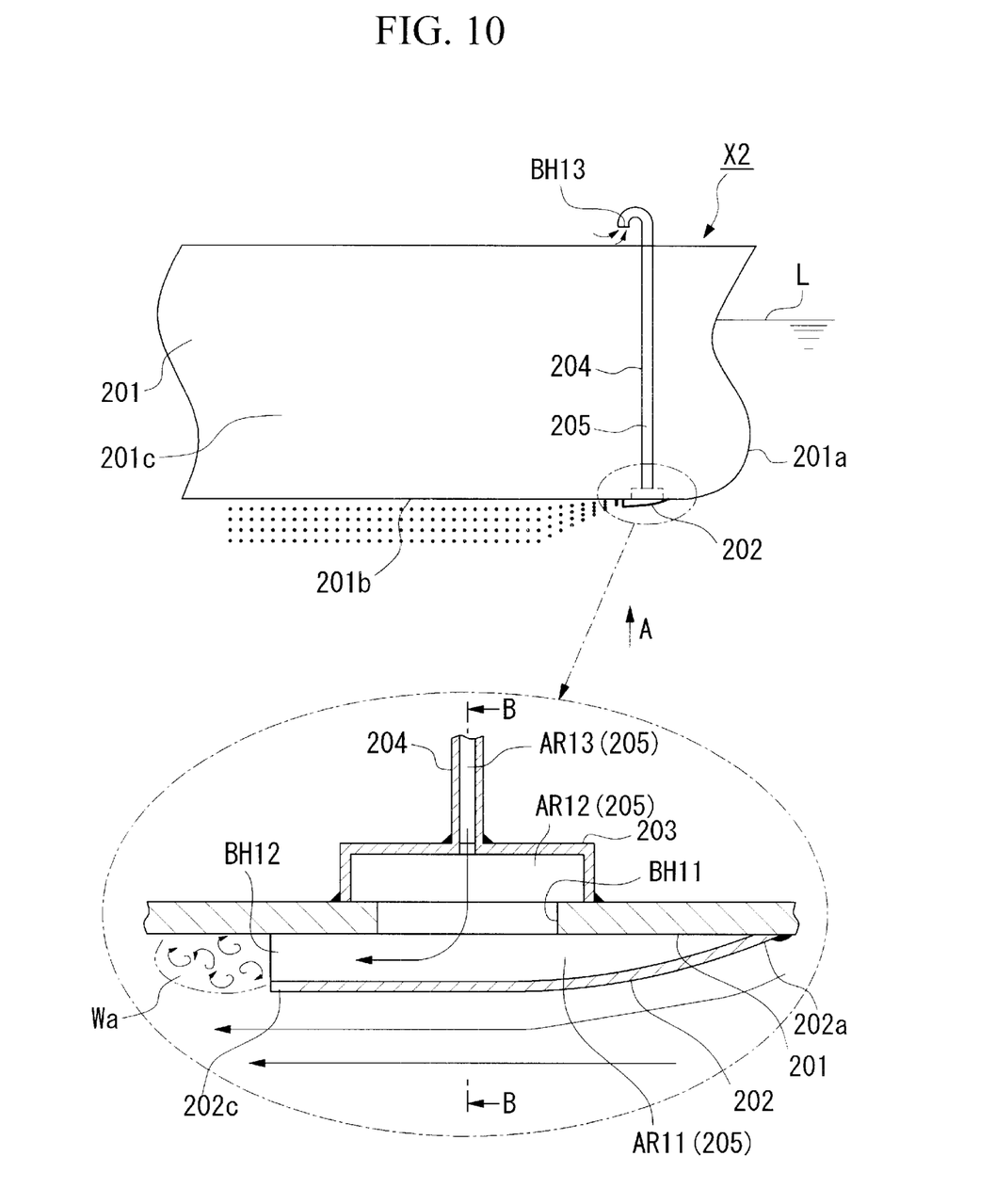
FIG. 10 is a diagram showing a main side view and an enlarged cross-sectional view of a ship with reduced frictional drag according to a fourth embodiment of the present invention.
Figure 11:
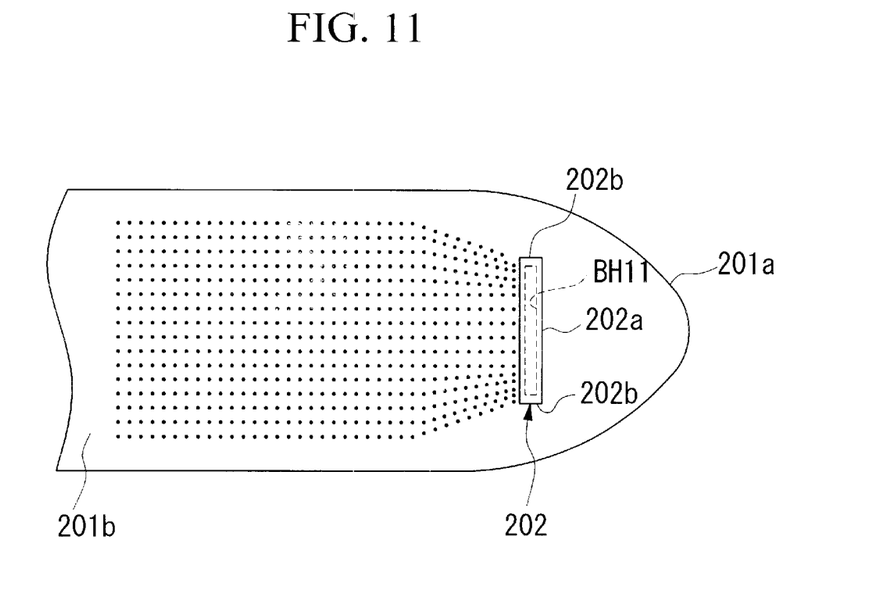
FIG. 11 is a diagram showing a view taken along line A shown in FIG. 10.

In the shell plating 201, as shown in FIG. 11, an elongated hole BH 11 which is elongated in the width direction of the ship is formed at the ship's bottom 201b in the vicinity of a bow 201a. Also, as shown in FIG. 10, a blowoff shell plating 202 is disposed so as to cover the elongated hole BH1 from the downward direction of the ship's bottom 201b, and a chamber bulkhead 203 is provided so as to cover the inner side of the elongated hole BH1.

Figure 12:
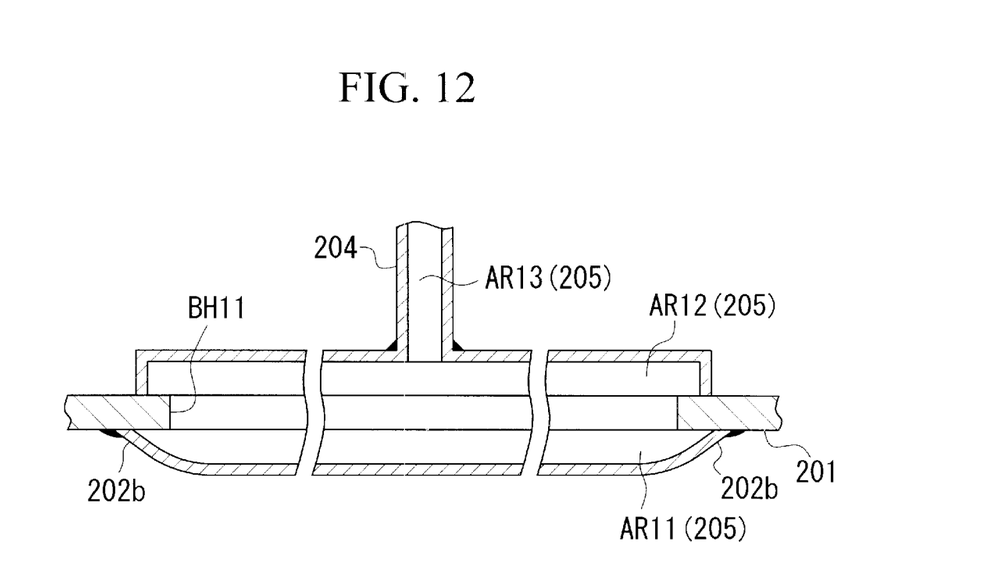
FIG. 12 is a diagram showing a cross-sectional view taken along line B shown in FIG. 10.

As shown in FIGS. 10 and 12, an edge portion 212a at the bow 201a side and both edge portions 202b in the width direction of the ship of the blowoff shell plating 202 are welded to the shell plating 201 so that the distance to the shell plating 201 gradually increases toward the stern. In this manner, a blowoff space AR11 is formed inside the blowoff shell plating 202 and a blowoff opening BH12 of a slit shape, which opens in the stern direction and elongates in the width direction of the ship, is provided with the blowoff space AR11. Also, as shown in FIG. 10, the blowoff shell plating 202 has a shape in which an edge portion 202c has a substantially right angle acutely closing the plating 202 so that the edge portion 202c forms acute angles with respect to the space in the vicinity of the edge portion 202c.

The chamber 203 bulkhead may be formed, for example, in a box shape, one face of which is opened, and a chamber space AR12 of a rectangular shape is formed inside thereof by welding an opening end with the shell plating 201. An air induction pipe 204 made of a tubular member is welded to a predetermined portion of the chamber bulkhead 203 so that a pipe space AR13 inside the air induction pipe 204 communicates with the chamber space AR12.

Also, the air induction pipe 204 is disposed so as to penetrate inside the hull in the upward direction from the chamber bulkhead 203. Also, an air intake opening BH13 is disposed with its upper end portion, which is protruded from the deck, being curved in U-shape, and the pipe space AR13 communicates with the atmospheric air at the downward end of the air intake opening BH13.

The above-mentioned blowoff space AR11, the chamber space AR12, and the pipe space AR13 communicate with each other, and a gas path 205 having one end opened to the atmospheric air at the air intake opening BH13 on the deck and the other end opened to water at the the blowoff opening BH12 formed on the ship's bottom 201b. Also, the blowoff shell plating 202, the chamber bulkhead 203, and the air induction pipe 204, which form the gas path 205, are subjected to a corrosion resistance treatment so that wall surfaces of at least the gas path 205 side are not corroded by sea water, and the cross-sectional area and the shape of each are determined so that, for preference, the fluid flowing in the path is not subjected to an extra pressure loss.

In the ship X2 with reduced frictional drag having the above-mentioned configuration, the level of sea water in the gas path 205 is the same as that around the ship in an anchorage state. When the ship travels, sea water flows along the shell plating 201 of the hull, and at the ship's bottom in the vicinity of the bow 201a, sea water flows along the outside surface of the blowoff shell plating 202. Since the blowoff shell plating 202 is designed so that the distance to the shell plating 201 of the hull gradually increases toward the stern, the flow rate of sea water flowing on the outer surface of the blowoff shell plating 202 gradually increases as its static pressure decreases. The flow rate of sea water reaches its maximum in the vicinity of a corner of the edge portion 202c of the blowoff shell plating 202 due to turning around the corner, etc., and a low-pressure portion is generated in the vicinity thereof. Since the difference in pressure generated by a fluid turning around an acute corner is extremely large, a flow separation area Wa associated with irregular strong vortexes is generated in the downstream area immediately behind the edge portion.

The pressure at the flow separation area Wa may be changed in a large degree depending on the depth of water, the navigation speed, or the shape of the blowoff shell plating 202. In this embodiment, based on experiments and analysis, the shape of the blowoff shell plating 202 is designed so that the pressure in the vicinity of the blowoff opening BH12, which is opened to the flow separation area Wa, becomes negative at the standard navigation speed.

Accordingly, during the travel at the standard navigation speed, the pressure at the flow separation area Wa is decreased to make the pressure in the vicinity of the blowoff opening BH12 negative, and sea water in the gas path 205, one end of which is opened to the atmosphere, is discharged from the blowoff opening BH12. After this, air continuously flows in the gas path 205 from the air intake opening BH13, and the air is delivered into water from the blowoff opening BH12 via the gas path 205.

Then, microbubbles (fine air bubbles) are generated in the vicinity of the flow separation area Wa due to the air delivered via the blowoff opening BH12, and the frictional drag between the shell plating 201 of the hull and the water is decreased by the microbubbles which flow toward the stern and cover the ship's bottom 201b.

That is, according to the ship X2 with reduced frictional drag of this embodiment, since the flow separation area Wa of negative pressure is generated in the vicinity of the corner of the edge portion 202c at the stern side of the blowoff shell plating 202, gas is delivered into water via the gas path 205 from the atmosphere, and hence, gas is delivered into water without the necessity of any driving forces other than the driving force for the navigation. Accordingly, the navigation power for the ship may be effectively saved by reducing the frictional drag using the microbubbles. In addition, according to this embodiment, since the flow separation area Wa is generated by fluid turning around the corner of the edge portion 202c at the stern side of the blowoff shell plating 202, the difference in pressure at the flow separation area Wa is extremely large and the static pressure at the blowoff opening BH12 may be easily made negative.

Figure 13:
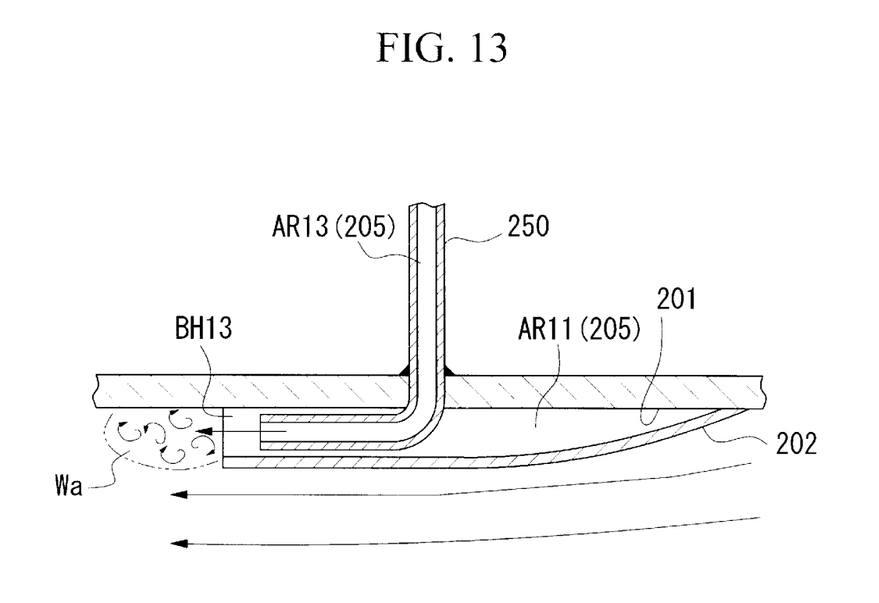
FIG. 13 is a diagram showing a cross-sectional view of an air induction pipe according to another embodiment.

Note that the shapes of the blowoff shell plating 202 and the gas path 205 are not limited to those described in the embodiments and the present invention may be applied to variety of shapes thereof. For instance, as shown in FIG. 13, an air induction pipe 250 may be bent substantially at a right angle in the blowoff space AR11 so that the opening end portion thereof is disposed in the vicinity of the blowoff opening BH12 and air is directly delivered toward the downstream side (the stern side) from the pipe space AR13 in the air induction pipe 250. By adopting such a configuration, it becomes possible to effectively deliver gas into water by decreasing a pressure loss in the gas path 205.

Figure 14:
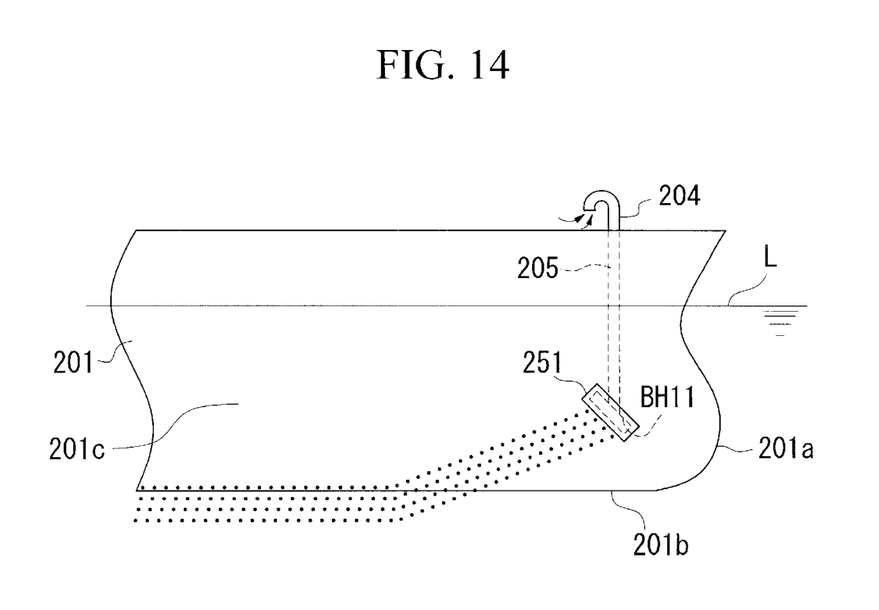
FIG. 14 is a diagram showing a main side view in which a blowoff shell plating is disposed at a ship.

Also, although the ship used in this embodiment is a flat bottom ship, if the ship has a relatively narrow bottom 201b, such as in the case of a high speed vessel, the elongated hole BH11 and the blowoff shell plating 251 are disposed at a shipboard 201c in the vicinity of the bow 201a, as shown in FIG. 14, and gas may be delivered therefrom. In this manner, the same effect obtained in the above-mentioned embodiments may be attained.

As explained above, it is possible to apply the present invention flexibly to various shapes of hulls or standard navigation speeds by suitably determining a position or a shape of flowing water guiding portions.

Figure 15:
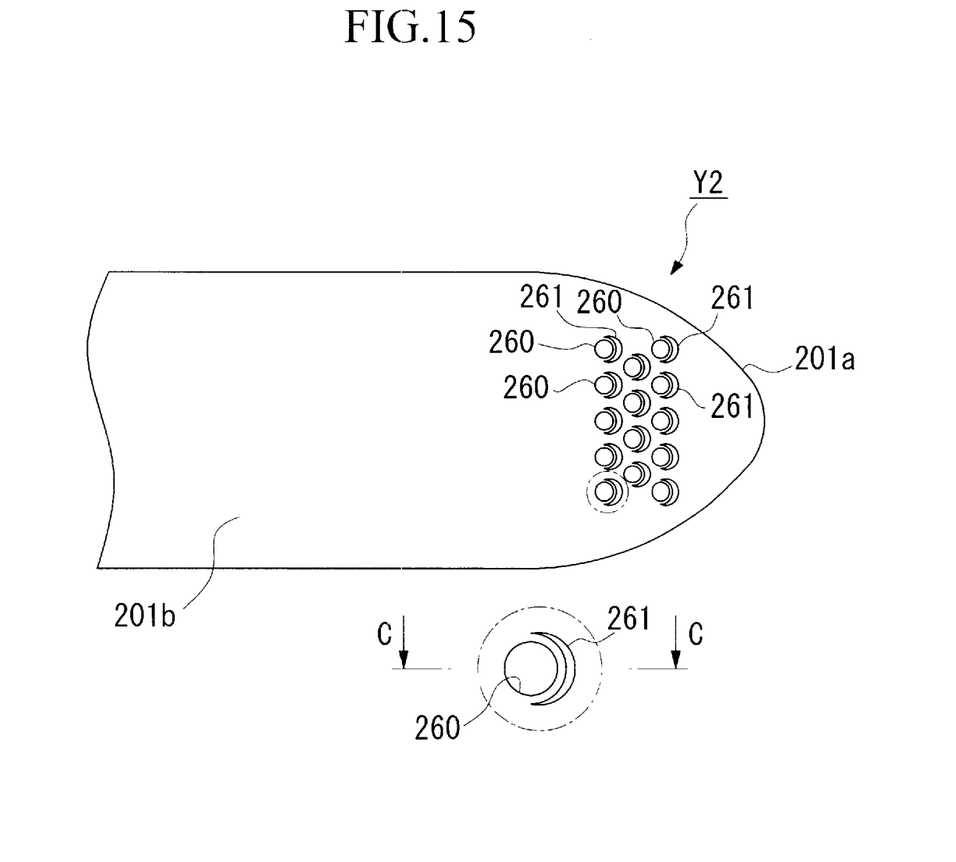
FIG. 15 is a diagram showing a main bottom view according to a fifth embodiment of the present invention.
Figure 16:
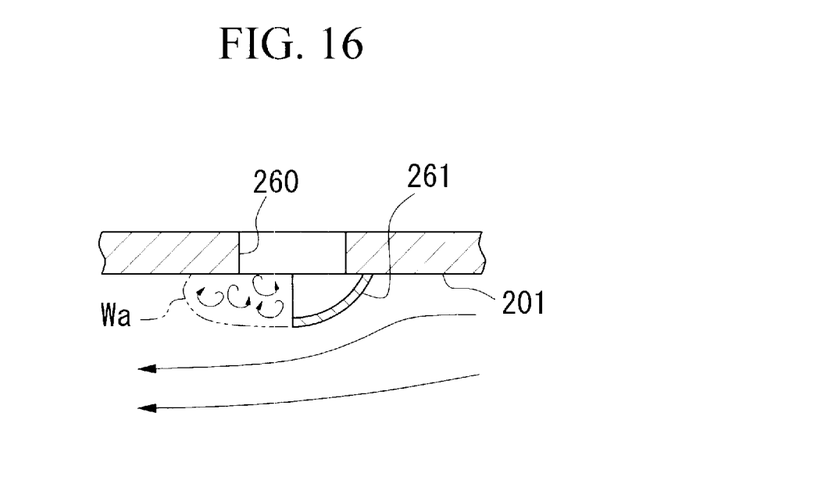
FIG. 16 is a diagram showing a cross-sectional view taken along line C shown in FIG. 15.

FIGS. 15 and 16 show a fifth embodiment according to the present invention.

In a ship Y2 with reduced frictional drag of this embodiment, a number of blowoff openings 260 of circular shape are formed on the ship's bottom 201b, and a blowoff shell plating 261 having a curved surface is disposed so as to surround a bow 201a side of each of the blowoff openings 260. In this embodiment, since the blowoff shell plating 261 is provided which corresponds to the size of each of the plurality of blowoff openings 260 disposed at the ship's bottom, it becomes possible to deliver gas from wide areas of the ship's bottom 201b without increasing the wave making resistance.

Figure 17:
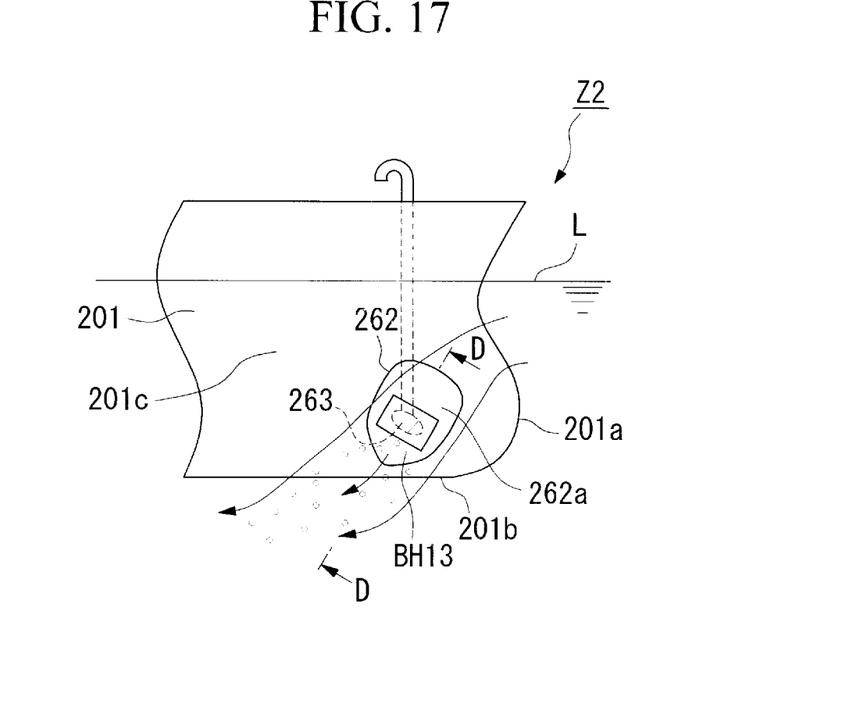
FIG. 17 is a diagram showing a main side view according to a sixth embodiment of the present invention.
Figure 18:
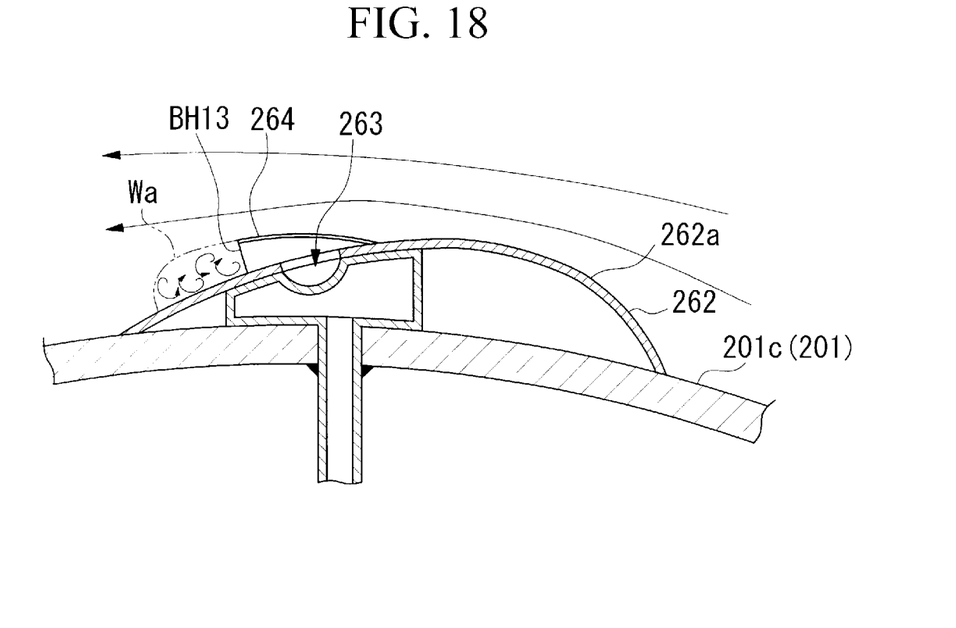
FIG. 18 is a diagram showing a cross-sectional view taken along line D shown in FIG. 17.

Also, FIGS. 17 and 18 show a sixth embodiment according to the present invention.

In a ship Z with reduced frictional drag of this embodiment, a gas blowoff portion 262 is disposed at the shipboard 201c in the vicinity of the bow 201a. The gas blowoff portion 262 is formed into a shape having the contour of a droplet and a curved surface 262a protruding from the shell plating 201 of the hull. In the vicinity of the top of the gas blowoff portion 262, a blowoff shell plating 264 is disposed so as to cover a gas discharge opening 263 of a concave shape. In this manner, the flow rate of sea water along the shell plating 201 of the hull increases while flowing along the protruded curved surface 262a of the gas blowoff portion 262, and a flow separation area Wa is generated at the blowoff opening BH13 due to the flow of increased rate. That is, according to this embodiment, since the flow rate of sea water along the blowoff shell plating 264 increases even if the navigation speed is low, it becomes possible to easily generate the flow separation area Wa of negative pressure.

Test for Friction Reducing Effect

The blowoff shell plating 202 as a negative pressure formation means and the air induction pipe 204 described in the above-mentioned fourth embodiment (refer to FIG. 10) were attached to a fishing vessel having the sizes indicated below, and the effect of reducing a frictional drag during the travel was examined.

Lpp: 11.2 m

Bmld: 2.94 m

Dmld: 0.74 m

In this test, five air induction pipes (AIP: Air Induction Pipe) are disposed at five places so as to penetrate the hull. Three of them were disposed at the ship's bottom in the vicinity of the center in the width direction of the ship, and the other two were disposed at the outer side of the ship's bottom so as to sandwich the center thereof in the width direction of the ship, so as to open the inside spaces. The speed of the ship Vh when the ship traveled at a predetermined engine rotation number (RPM) was measured for two cases: (A) where air was delivered into water by opening the inside space of the air induction pipe (opened AIP); and (B) where air was not delivered into water by closing one end of the air induction pipe (closed AIP). The results obtained were compared and shown in the table below (Table 1).

TABLE 1

| RPM | Vh at opened AIP Knots | Vh at closed AIP Knots | Difference Knots |
|---|---|---|---|
| 1800 | 15.1 | 14.8 | 0.3 |
| 2000 | 18.0 | 17.3 | 0.7 |
| 2300 | 20.7 | 20.4 | 0.3 |

From the results shown in Table 1, since the difference in the navigation speed (Difference Knots) is the largest at the rotation number of 2000 rpm, it is considered that a sufficient amount of air was delivered into the water via the air induction pipe, and the frictional drag of the ship was effectively reduced by the negative pressure system. On the other hand, when the rotation number was 1800 rpm, it is assumed that although the frictional drag of the ship was reduced, the amount of air introduced into water was not sufficient. Also, when the rotation number was 2300 rpm, it is assumed that the effect obtained by reducing the frictional drag was decreased due to the increase of a drag force generated by the blowoff shell plating disposed on the ship's bottom. Note that it was confirmed that air flowed through all of the air induction pipes when the rotation number was 2000 rpm whereas the flow of air in the two air induction pipes disposed at the outer side was not smooth when the rotation number exceeded 2000 rpm.

The above results indicate that it is possible to effectively reduce the frictional drag of a ship using air bubbles by minimizing the increase in the drag force due to a negative pressure formation portion, such as the blowoff shell plating, and forming a negative pressure portion in water so as to supply a sufficient amount of air thereto. That is, the results indicate that it is possible to deliver air into water by simply forming a negative pressure portion in water, not by using a pressurizing device, such as a gas supply device, and the driving force for the navigation of a ship may be effectively saved thereby.

Industrial Applicability

In the method for reducing a frictional drag of a ship and a ship with reduced frictional drag according to the present invention, it is possible to effectively reduce a frictional drag of a ship using air bubbles by forming a negative pressure portion in water, introducing air from a gas space to the negative pressure portion in water, and discharging air bubbles into water. Also, since it is not necessary to pressurize air when delivering the air into water, the power required for delivering the air may be reduced and the driving force for the navigation of a ship may be effectively reduced. Moreover, a gas supply device for delivering air into water becomes unnecessary, a cost for device or operation may be reduced, and the construction cost for a ship may be easily reduced.

What is claimed is:

1. A method for reducing a frictional drag between a ship and water by generating bubbles in the vicinity of a surface of a shell plating, comprising:

forming a passage of water between a fin, which is disposed to be separated from the shell plating, and the shell plating, the passage being disposed in the vicinity of a bow portion of the ship;

forming a negative pressure portion in the passage whose pressure becomes lower than the pressure in a gas space during the travel of the ship; and introducing gas from the gas space into the negative pressure portion to discharge bubbles into water.

2. A method for reducing a frictional drag of a ship according to claim 1 wherein the negative pressure portion is formed in water by increasing the speed of water relative to the ship at a particular point.

3. A ship with reduced frictional drag in which a frictional drag between the ship and water is reduced by generating bubbles in the vicinity of a surface of a shell plating, comprising: a negative pressure formation part which is disposed at the shell plating to form a negative pressure portion in water whose pressure becomes lower than the pressure in a gas space, and a gas path which introduces gas from the gas space to the negative pressure portion in water, wherein the negative pressure formation part includes a fin which is disposed to be separated from the shell plating, and a passage in which the negative pressure portion is formed is provided between the fin and the shell plating, the passage being disposed in the vicinity of a bow portion of the ship.

4. A ship with reduced frictional drag according to claim 3, wherein the passage is formed so as to gradually decrease its cross-sectional area toward a stern, and one end of the gas path is opened to the atmospheric air, and the other end of the gas path is opened to an area of the passage where the cross-section of the passage is small.

5. A ship with reduced frictional drag according to claim 3 or 4, wherein the passage is disposed at the ship's bottom in the vicinity of the bow portion in a state extending in the width direction of the ship.

6. A ship with reduced frictional drag according to claim 3, wherein a plurality of the passages are arranged at the ship's bottom in the vicinity of a the bow portion in the width direction of the ship.

7. A ship with reduced frictional drag according to claim 3, wherein the negative pressure formation part is disposed so as to increase the speed of water relative to the ship at a particular point associated with the travel of the ship.

* * * * *